No. 840,223. PATENTED JAN. 1, 1907.
J. LAIDLAW & J. W. MACFARLANE.
CLUTCH OR BRAKE MECHANISM.
APPLICATION FILED MAY 22, 1905.
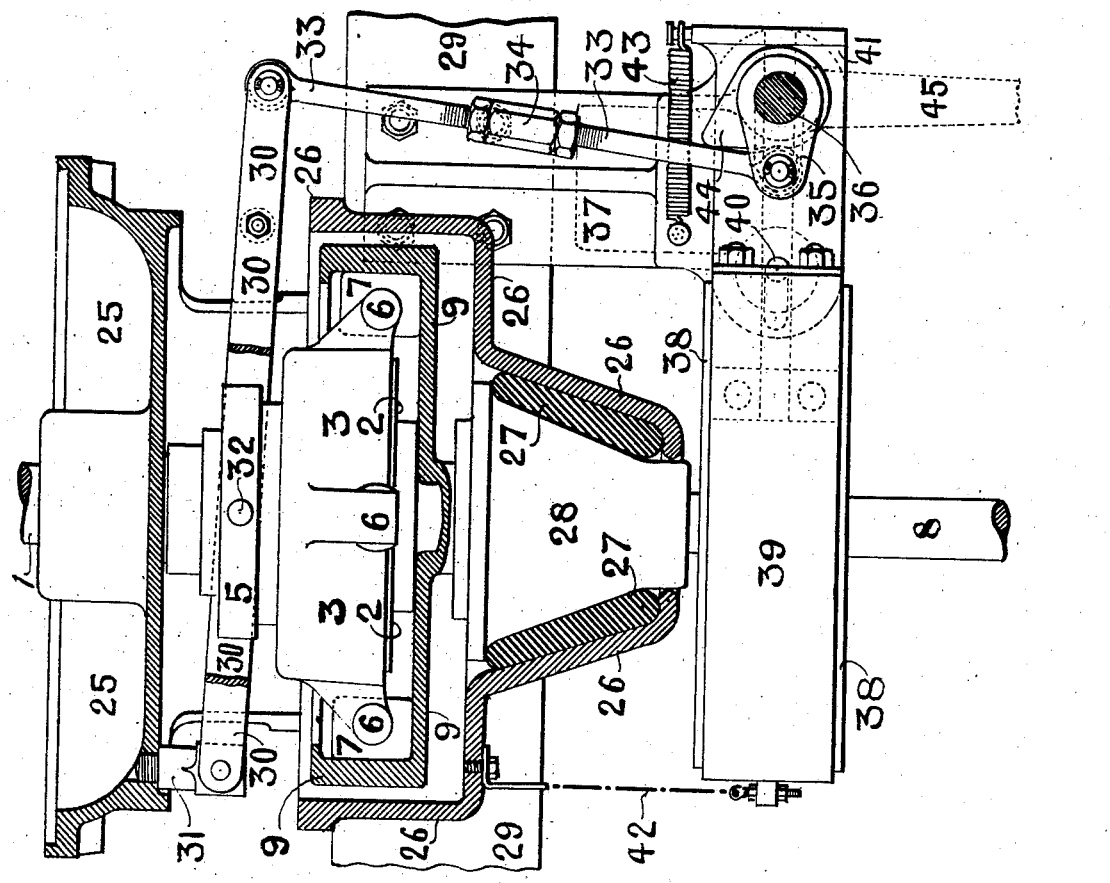
WITNESSES
Paul A. Blair
Walter Abbt
INVENTORS
John Laidlaw
James Wright Macfarlane
BY
Howson and Howson
ATTORNEYS

UNITED STATES PATENT OFFICE.

JOHN LAIDLAW AND JAMES WRIGHT MACFARLANE, OF GLASGOW, SCOTLAND.

CLUTCH OR BRAKE MECHANISM.

No. 840,223.　　　　Specification of Letters Patent.　　　　Patented Jan. 1, 1907.

Application filed May 22, 1905. Serial No. 261,693.

*To all whom it may concern:*

Be it known that we, JOHN LAIDLAW and JAMES WRIGHT MACFARLANE, subjects of the King of Great Britain and Ireland, and residents of Glasgow, Scotland, (whose postal address is 98 Dundas street, Kingston, Glasgow, Scotland,) have invented certain new and useful Improvements in and Connected with Clutch or Brake Mechanism for Centrifugal Machines, of which the following is a specification.

Hitherto when centrifugal machines have been driven by electric motors it has been customary to start and stop the motor when it was desired to start and stop the machine.

The invention has for its object to provide improved means for operating a clutch applied between two shafts and a brake applied to one of the shafts, such that the clutch and brake can only be put into operation alternately and not simultaneously—that is to say, if the clutch be in gear the brake must of necessity be off, if the brake be on the clutch must be out of gear. Thus risk of damage due to inadvertent putting on of the brake when the clutch is in gear and putting in gear of the clutch when the brake is on is entirely eliminated.

In order that the invention and the manner of performing the same may be properly understood, there is hereunto appended a sheet of explanatory drawings, showing in sectional elevation the application of the improved clutch and brake operating mechanism to a centrifugal machine.

In the drawings, the improved clutch and brake operating mechanism is shown in combination with the clutch forming the subject-matter of our concurrent application for a patent filed March 2, 1906, Serial No. 303,847. The electric motor (which is not shown) is carried upon a stool 25, which is formed as an extension of the usual housing 26, carrying the basket-carrying spindle 8, by means of a conoidal buffer 27 of known type, which engages the outer conical surface of the bearing 28 of that spindle, the whole being shown as carried upon beams 29.

The stirrup-ring 5 of the clutch is operated by a bifurcated stirrup-lever 30, centered upon a stud 31 in the lower part of the motor 25 and engaging trunnion-pins 32, formed upon the ring 5. This lever 30 extends laterally outward in a single arm, which is connected by a link 33 (which is made in two parts relatively adjustable by means of a nut 34, lock-nuts being provided to secure it in position) to a crank 35 on a shaft 36, carried in suitable brackets, one, 37, of which is shown as secured to the beam 29.

The brake, which is of a well-known type usually applied to centrifugal machines, consists of a brake-drum 38, fixed to the spindle 8 and encircled by a brake-band 39. The brake-band is attached at one end to the bracket 37 by a rod 40, and at the other end is slotted to take the rod 40 and the shaft 36 upon which it rides, and at its extreme outer edge is provided with a bearing-strip 41, while at the side remote from its connection to the shaft and the rod 40 it is supported by a chain 42 from the housing 26. Normally the brake-band 39 is held out of gear with the drum 38 by a spring 43; but when it is desired to stop the spindle 8 it is engaged with that drum by a cam 44, carried upon the shaft 36, and which engages the bearing-strip 41.

A handle 45 (indicated by dotted lines) is provided for rotating the shaft 36, so as to operate the brake by means of the cam 44 and the clutch by means of the crank 35.

The crank 35 and the cam 44 are so positioned relatively to each other and to the parts which they operate that in the position in which the parts are shown neither clutch nor brake is in operation. If, however, the handle 45 be moved to the right, the clutch is thrown into gear through the movement imparted to its stirrup-ring 5 through the link 33 and stirrup-lever 30, while the position of the brake is not altered. If, however, the handle 45 be moved to the left, the cam 44 immediately encountering the bearing-strip 41 commences to operate the brake, while at the same time the only effect upon the clutch is to move its members farther apart—that is to say, therefore, that movement of the handle in the one direction operates the clutch to throw it into gear, the brake remaining free, while movement in the opposite direction puts on the brake, the clutch remaining free—and when the parts are in mid-position both clutch and brake are out of operation. Thus while the motor is running the centrifugal machine may be started by a movement of the handle 45 to the right, and when it is desired to stop the machine (the motor still continuing to rotate) the clutch is freed and the brake put on by a movement of the handle to the left, or while the handle is in mid-position the machine is free to be turned by hand, if required, to facilitate the discharge of its contents. At the same time it is obviously impossible that both brake and clutch be put into operation at the same time.

Clearly the improved clutch and brake operating devices are applicable to brakes and clutches of forms other than those referred to herein.

We claim as our invention—

In combination with a continuously-running shaft, and a second shaft coaxial therewith and intermittently driven therefrom, a clutch between the two shafts for intermittently connecting them, a clutch-operating lever, a band-brake upon the second shaft, a handled operating-shaft, a crank thereon, a link between the crank and the clutch-operating lever, and a cam upon the handled shaft and operating the brake, the crank and cam being so set relatively to each other and to the parts they operate that clutch and brake can only be engaged alternatively and not simultaneously.

In testimony whereof we have signed our names to this specification in the presence of two subscribing witnesses.

JOHN LAIDLAW.
JAMES WRIGHT MACFARLANE.

Witnesses:
DAVID FERGUSON,
URIPED HUNT.